(12) United States Patent
Smith et al.

(10) Patent No.: US 12,158,621 B2
(45) Date of Patent: Dec. 3, 2024

(54) INTERSTITIAL RECESSED CANTILEVER LATCH MECHANISM FOR FIBER OPTIC AND ELECTRICAL CONNECTORS

(71) Applicant: Nest Technical Services, Inc., Westerly, RI (US)

(72) Inventors: Daniel Matthew Smith, Westerly, RI (US); William M. Smith, Dedham, MA (US)

(73) Assignee: Nest Technical Services, Inc., Westerly, RI (US)

( * ) Notice: Subject to any disclaimer, the term of this patent is extended or adjusted under 35 U.S.C. 154(b) by 187 days.

(21) Appl. No.: 17/803,522

(22) Filed: Aug. 8, 2022

(65) Prior Publication Data

US 2023/0050053 A1 Feb. 16, 2023

Related U.S. Application Data

(60) Provisional application No. 63/259,856, filed on Aug. 16, 2021.

(51) Int. Cl.
  *G02B 6/38* (2006.01)
  *G02B 6/40* (2006.01)
  *H01R 13/506* (2006.01)

(52) U.S. Cl.
  CPC ........... *G02B 6/387* (2013.01); *G02B 6/3831* (2013.01); *G02B 6/406* (2013.01); *H01R 13/506* (2013.01)

(58) Field of Classification Search
  CPC .................................................... G02B 6/383
  See application file for complete search history.

(56) References Cited

U.S. PATENT DOCUMENTS

| | | | | |
|---|---|---|---|---|
| 5,828,804 A * | 10/1998 | Akins | .................. | G02B 6/3873 385/70 |
| 5,828,805 A * | 10/1998 | Morlion | ............... | G02B 6/3885 385/71 |
| 6,267,513 B1 * | 7/2001 | Seto | ...................... | G02B 6/3825 385/56 |
| 6,527,450 B1 * | 3/2003 | Miyachi | ............... | G02B 6/3888 385/56 |
| 8,348,524 B2 * | 1/2013 | Iwamizu | ............ | A61B 1/00165 385/117 |
| 8,382,506 B2 | 2/2013 | Reed et al. | | |
| 8,678,846 B2 | 3/2014 | Hitchcock et al. | | |
| 8,834,038 B2 | 9/2014 | Limbert et al. | | |
| 9,494,744 B2 | 11/2016 | de Jong | | |
| 9,709,752 B2 * | 7/2017 | Sawada | ............... | G02B 6/3826 |
| 10,063,006 B2 | 8/2018 | Mathews et al. | | |
| 10,641,968 B2 | 5/2020 | Takano et al. | | |
| 11,280,972 B2 | 3/2022 | Takano et al. | | |
| 2023/0050053 A1 * | 2/2023 | Smith | .................... | G02B 6/406 |
| 2023/0333328 A1 * | 10/2023 | Watson | ............... | G02B 6/3898 |
| 2023/0400645 A1 * | 12/2023 | Watson | ................. | G02B 6/387 |

FOREIGN PATENT DOCUMENTS

CN 114578490 A * 6/2022 ........... G02B 6/3869

\* cited by examiner

*Primary Examiner* — Rhonda S Peace

(57) ABSTRACT

An interstitial recessed cantilever latch mechanism for fiber optic and electrical connectors is disclosed. This mechanism enables the design of more spatially efficient multi-position connectors while retaining the reliability and tactile feedback of traditional connector latch mechanisms. The mechanism also allows the receptacle interface to be substantially simplified, and reduces the number of unique components required by means of a hermaphroditically assembled backshell half.

9 Claims, 7 Drawing Sheets

INTERSTITIAL RECESSED CANTILEVER LATCH MECHANISM FOR FIBER OPTIC AND ELECTRICAL CONNECTORS

FIELD OF THE INVENTION

This invention relates to the latching of fiber optic and electrical connectors and adapters, and securing the mated connections resulting therefrom.

BACKGROUND OF THE INVENTION

As data demands have increased, the tendency has been for the overall size of both electrical and fiber optic connectors to get smaller, so as to enable fitting more connectors of a given type into a given physical space. However, given the performance requirements, there is a limit to how small the contacts, whether they are electrical pins or fiber optic ferrules, can realistically be. Any means of reducing the overall size of a given connector would therefore be advantageous.

Latch-type connectors are commonly seen across the industry in both electrical and fiber optic connectors. Examples of electrical connectors include the RJ11 and RJ45 interfaces, while in the realm of fiber optics, the common LC and MPO types both use latches to result in a mechanically secure connection. Latches are usually preferred over electrical press-fit connectors, such as USB-A, because they provide visual, audible, and tactile feedback to the user when properly mated. In the case of fiber connectors, a latch is necessary to provide sufficient and secure depth-of-mate to ensure physical contact upon which optical performance of the connection depends.

The major drawback of current latch-type designs is that the latch is always placed outside the envelope of the contact pattern. This means that the inclusion of the latch mechanism increases the overall envelope of the connector interface, forcing it to become either wider or taller than the connector would otherwise need to be. As such, a mechanism which utilizes the space between contacts could achieve the advantages of a latch-type connection while at the same time minimizing the overall size of the connector interface.

SUMMARY OF THE INVENTION

Embodiments of the inventive connectors and connector components described overcome disadvantages of previous connectors, connector components, and attachment means and allow more connectors to be used within a given space.

According to one embodiment of the invention, there is provided a connector plug comprised of a connector housing at the proximal end, a two-part backshell at the distal end, with a plurality of contacts housed within in a pre-defined contact pattern. Cantilever latching arms extend from the proximal end of the backshell. When mating with the receptacle, these latching arms depress into interstices between contact positions on the plug and snap into latching points located on the receptacle. Touch points are provided to enable the user to depress the latching arms and release the connector plug when required.

According to another embodiment of the invention, the two parts of the backshell are identical and mate to each other hermaphroditically.

According to another embodiment of the invention, an ergonomically-designed decoupler is added encircling the connector plug, which when pulled towards the distal end of the connector, cams over an angled surface on the latching arms, depressing them and releasing the connector plug.

Any combination or permutation of embodiments is envisioned. Additional advantageous functions, features, and applications of the disclosed systems, methods, and assemblies will be apparent from the detailed description which follows, particularly when read in conjunction with the appended figures. All references listed in this disclosure are hereby incorporated by reference in their entireties.

BRIEF DESCRIPTION OF THE DRAWINGS

Other aspects and advantages of the invention will be apparent from the following detailed description wherein reference is made to the accompanying drawings. In order that the invention may be more fully understood, the following figures are provided by way of illustration, in which.

DETAILED DESCRIPTION OF THE INVENTION

Figure 1:
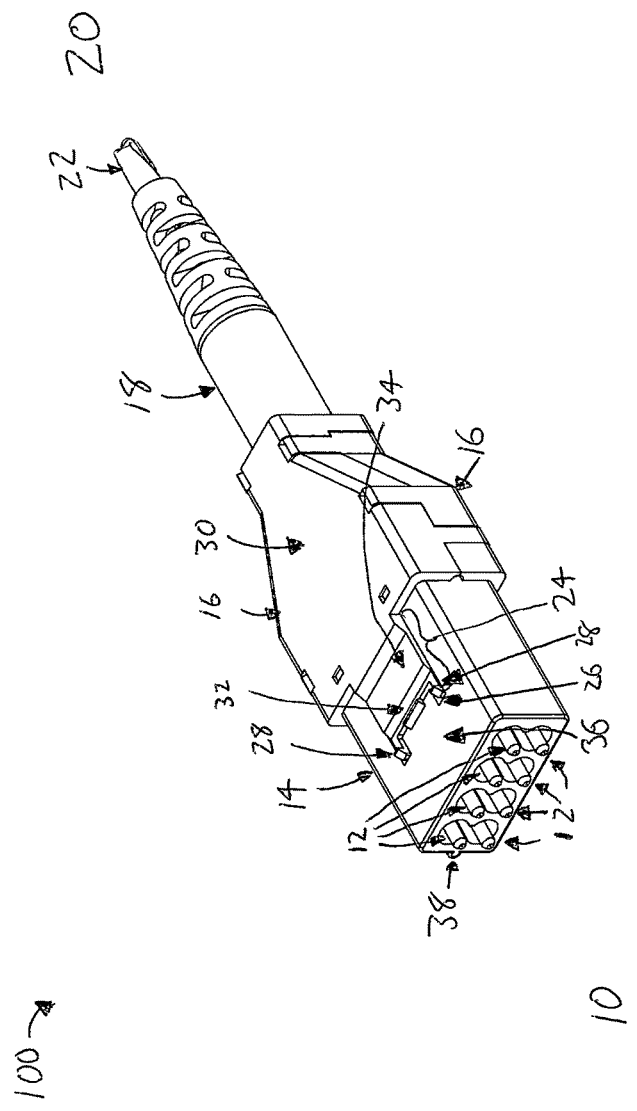
FIG. 1 is a perspective view of an exemplary fiber optic connector plug assembly with cantilever latch arms extending from the backshell.
Figure 2:
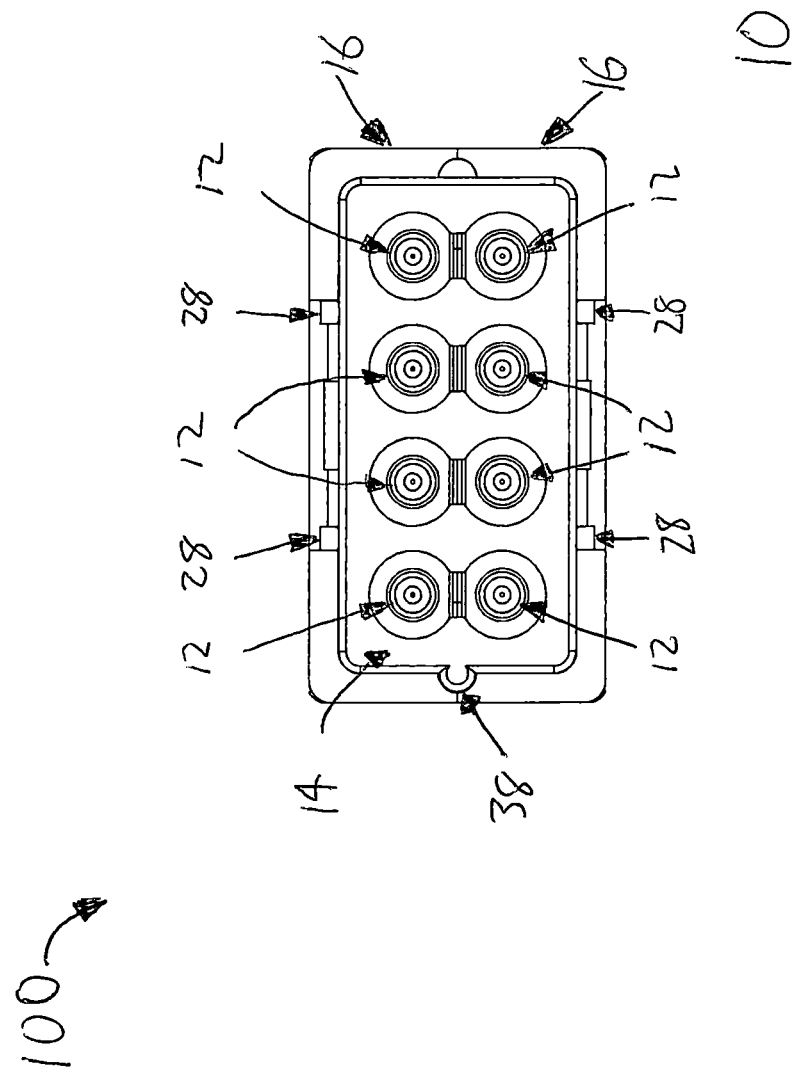
FIG. 2 is a face view of the proximal end of the fiber optic plug assembly of FIG. 1

FIG. 1 illustrates an exemplary plug assembly 100. The contacts, in this case fiber optic ferrules 12, are arrayed in a 4×2 pattern at proximal end 10 of the connector, housed within plug housing 14, which is in turn assembled between two backshell halves 16, with an elastomeric connector boot 18 providing strain relief for a cable 22 extending from main body 30 in the direction of distal end 20. Extending from each backshell half 16, in the direction of proximal end 10, is a cantilever 24, which fits into opening 26 of plug housing 14. Each cantilever 24 includes two latches 28, ramp 32, and press surface 34. Part of the cantilever 24 therefore sits below the top surface 36 of plug housing 14. The underside of plug assembly 100 is substantially identical aside from the placement of alignment key 38, as can be more clearly seen in FIG. 2. Also more easily observed in FIG. 2 is the fact that the latches 28 are placed in the interstitial space between fiber optic ferrules 12, affording the maximum distance inside the plug housing 14 for the cantilever to depress and release plug assembly 100 from a mating receptacle. This can be performed by applying simultaneous pressure to press surface 34 on both backshell halves 16. During this action, latches 28 can retract below top surface 36, enabling the latching mechanism to remain as close to the envelope of plug housing 14 as possible.

Figure 3:
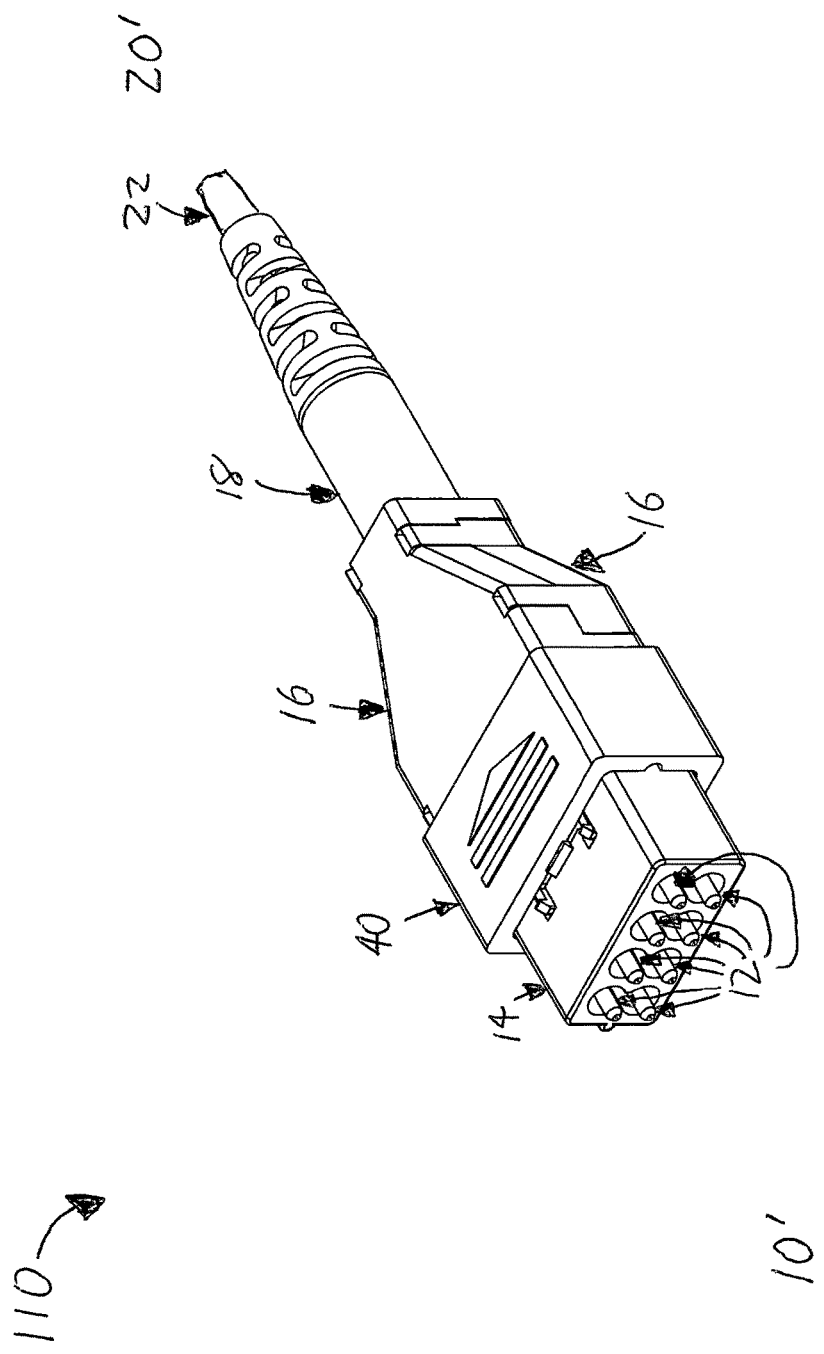
FIG. 3 is a perspective view of the connector plug assembly of FIGS. 1-2 with an additional sliding decoupler assembled to it.

Further improvement to the assembly ergonomics is possible with the addition of another component as seen in FIG. 3. Here exemplary plug assembly 110 is made using all of the same components as plug assembly 100 from FIGS. 1 and 2, with the addition of decoupler 40. When decoupler 40 is pulled in the direction of distal end 20', it engages with ramp 32, which is hidden underneath decoupler 40, again retracting the latches inside of plug housing 14, releasing plug assembly 110 from a mating receptacle. Such a component is useful in high-density applications where finger access to the connector may be limited.

Figure 4:
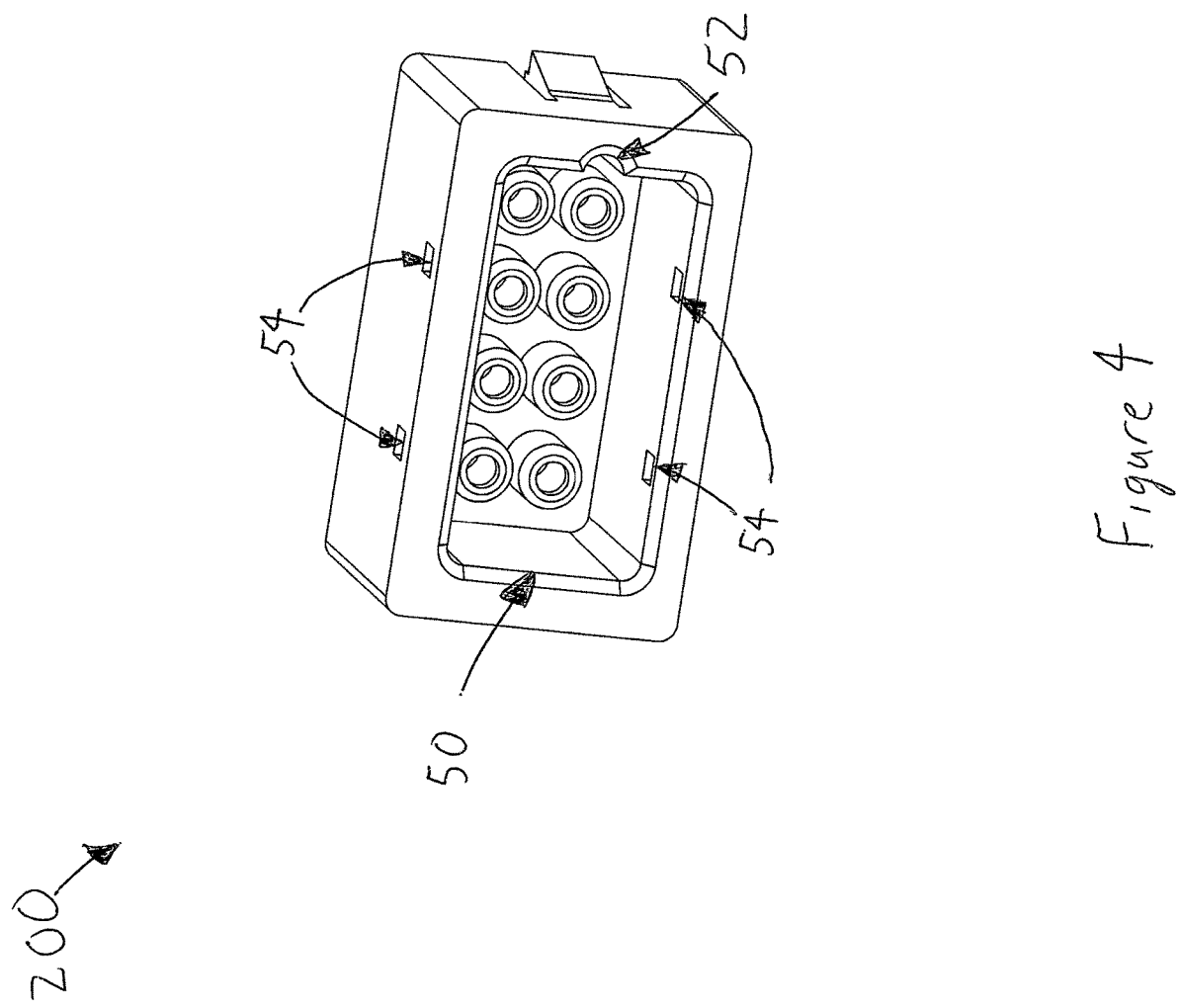
FIG. 4 is a perspective view of a receptacle which mates to the connector plug assembly of FIGS. 1-3.

Both plug assembly 100 from FIGS. 1 and 2 and plug assembly 110 from FIG. 3 are designed to mate to the exemplary receptacle 200 shown in FIG. 4. The receptacle provides front opening 50 to accept the proximal ends 10 and 10' of plug assemblies 100 and 110, respectively. Keyway 52 aligns with alignment key 38 of plug housing 14, ensuring contacts line up when the latches 28 snap into latch points 54. Note how the top and bottom edges of opening 50 are completely smooth, as no vertical allowance is required to enable actuation and clearance of the latches in that direction. In prior art, additional features would be required for latch clearance, expanding the overall envelope of the connector interface.

Figure 5:
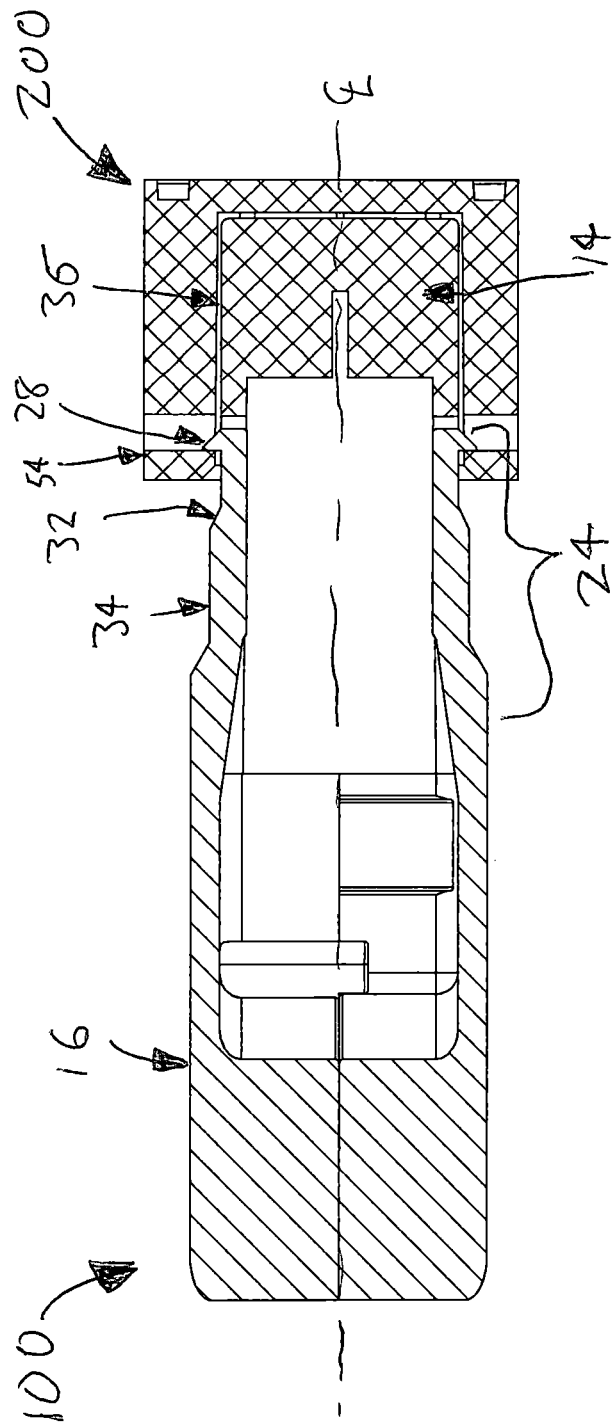
FIG. 5 is a section view of the connector plug assembly of FIG. 3 when latched to the receptacle of FIG. 4, sectioned in plane with one of the latches.

The simplicity of the latching mechanism is further illustrated by FIG. 5. Here plug assembly 100 has been mated to receptacle 200. The contacts have been removed from FIG. 5 for the sake of clarity. At this particular section point, there would be contacts in front of and behind the section plane, but open clearance inside the assembly where cantilever 24 would be depressed when mating and unmating plug assembly 100.

Figure 6:
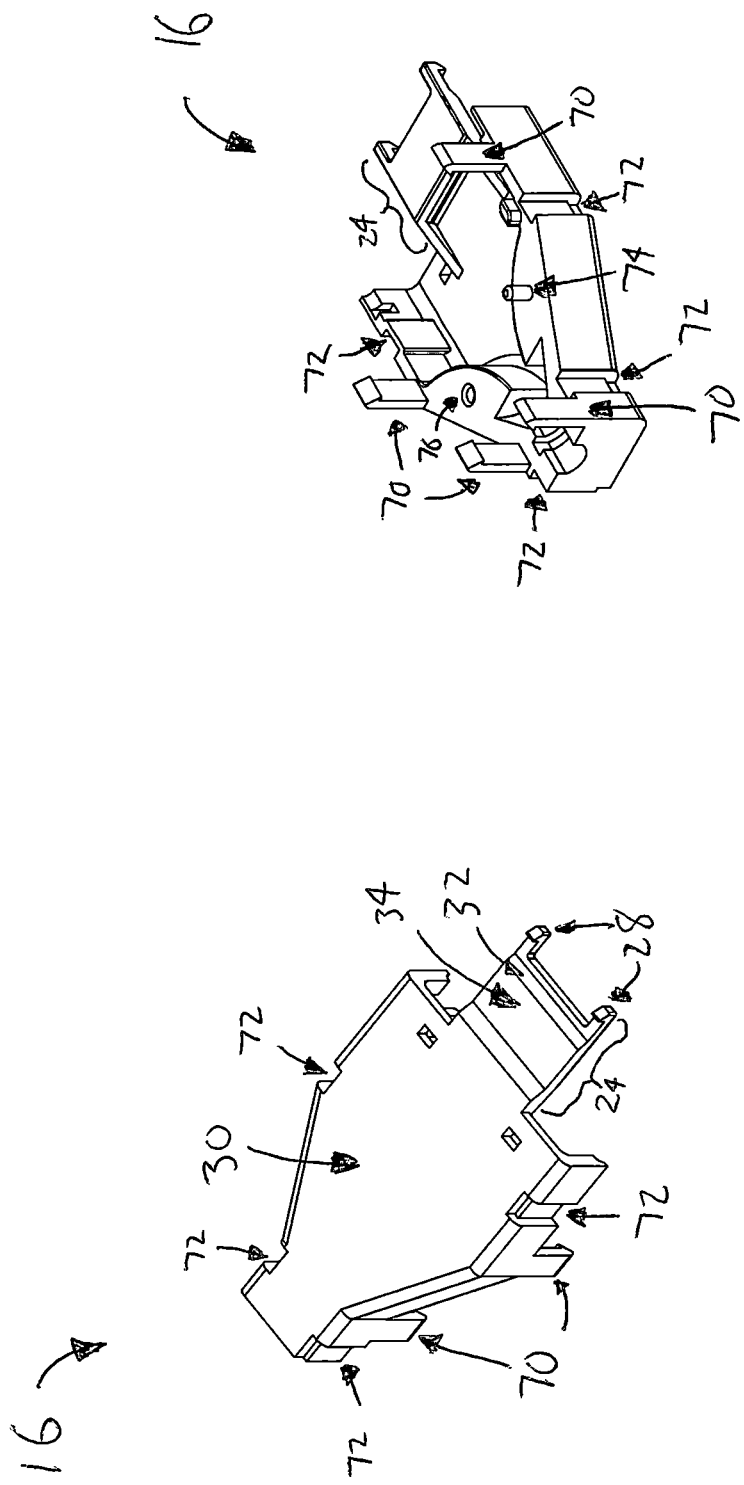
FIG. 6 is a perspective view of the hermaphroditically assembled backshell half.

FIG. 6 shows exemplary backshell half 16 in greater detail, with top and bottom perspective views. Note that backshell half 16 is designed to assemble hermaphroditically, so that the exact same component can be used for both the top and bottom half of a given backshell, rather than requiring two different molded parts. Snap extensions 70 are mirrored by snap slots 72, as locator post 74 is mirrored by locator hole 76. It should be noted that it is not strictly necessary for both backshell halves to be identical, and that a functional connector plug assembly could be constructed with latches on only one side of the backshell. However, using a hermaphroditic design as exemplified in FIG. 6 reduces the number of different components in the top level assembly, while increasing the production volumes of the backshell half components. This reduces the tooling and unit production costs of the top level assembly, respectively.

Although the above example revolves around a fiber optic connector design, it would be clear to a person skilled in the art that the latch design mechanism and principles of layout and construction would apply to low voltage electrical connectors, as well. At higher voltages, the requisite opening in the connector plug housing may pose a safety risk, limiting the usefulness of the design.

Figure 7:
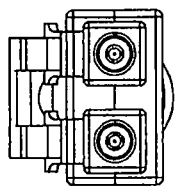
FIG. 7 is a typical prior art connector with the latch mechanism external to the contact field envelope.
Figure 7:
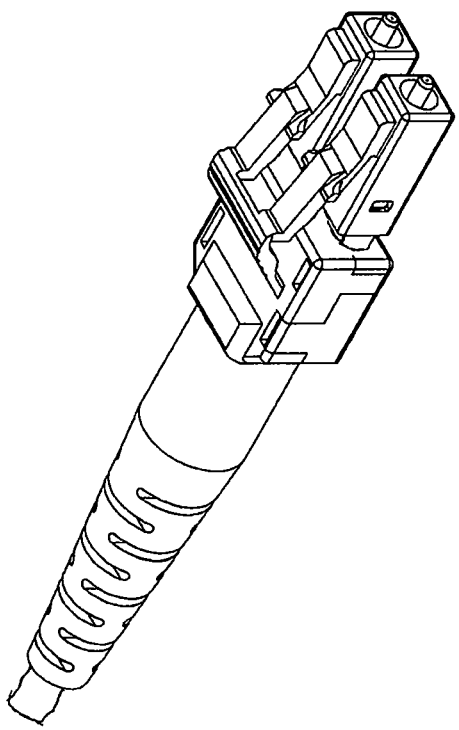

When comparing the present invention to prior art connectors such as the LC type, a duplex version of which is shown in FIG. 7, there is an obvious difference in the ratio between the outward size of the latching mechanism as compared to the area occupied by contacts at the proximal end of the connector. With the LC connector, the latch mechanism occupies nearly half of the proximal area, whereas with the present invention, it occupies a negligible part of it. The result is a smaller connector for a given contact pattern, enabling higher contact densities at the panel, and superior ergonomics at equal densities as compared to previous technologies.

The above example is used for illustrative purposes only, and should not be construed as limiting. Any combination or permutation of embodiments is envisioned. Additional advantageous functions, features, and applications of the disclosed systems, methods, and assemblies will be apparent to persons skilled in the art when combined with the appended figures.

What is claimed is:

1. A connector assembly, comprising:
   A plug housing containing a plurality of contacts, defining a proximal and distal end; and
   a backshell consisting of two backshell halves located at the distal end of the plug housing, wherein a cantilever extends from the proximal end of the backshell and recesses into a corresponding opening in the plug housing, with at least one latch located at the proximal end of the cantilever in the interstitial space between contacts.

2. The connector assembly of claim 1, wherein the cantilever includes a broad surface which can be pressed to disengage the latch.

3. The connector assembly of claim 1, wherein the cantilever includes a ramp over which a sliding decoupler can slide and depress the cantilever to disengage the latch.

4. The connector assembly of claim 1, wherein the backshell halves assemble to one another hermaphroditically.

5. The connector assembly of claim 4, wherein the backshell halves are substantially identical to one another.

6. The connector assembly of claim 1, wherein the contacts are fiber optic ferrules.

7. The connector assembly of claim 1, wherein the contacts are electrical contacts.

8. The connector assembly of claim 1, wherein the contacts include at least one fiber optic ferrules and at least one electrical contact.

9. The connector assembly of claim 1, wherein there are a plurality of cantilevers, each of which with at least one latch located at the proximal end of the cantilever.

\* \* \* \* \*